United States Patent [19]

Draisbach et al.

[11] 4,175,770
[45] Nov. 27, 1979

[54] MOTOR VEHICLE SUSPENSION STRUTS

[75] Inventors: Adolf Draisbach, Kelsterbach; Kurt H. Fiedler, Geinsheim, both of Fed. Rep. of Germany

[73] Assignee: General Motors Corporation, Detroit, Mich.

[21] Appl. No.: 861,860

[22] Filed: Dec. 19, 1977

[30] Foreign Application Priority Data

Dec. 24, 1976 [DE] Fed. Rep. of Germany ....... 2658835

[51] Int. Cl.$^2$ ............................................. B60G 11/14
[52] U.S. Cl. .................................. 280/668; 267/20 A; 280/696
[58] Field of Search ............... 280/666, 667, 668, 691, 280/692, 696, 701; 267/20 R, 20 A, 20 C, 60, 33

[56] References Cited

U.S. PATENT DOCUMENTS

| | | | |
|---|---|---|---|
| 2,856,198 | 10/1958 | Muller | 267/20 A |
| 3,589,701 | 6/1971 | Gee | 280/668 |

FOREIGN PATENT DOCUMENTS

| | | | |
|---|---|---|---|
| 1968945 | 9/1967 | Fed. Rep. of Germany | 280/668 |
| 7208788 | 5/1972 | Fed. Rep. of Germany | 280/668 |

*Primary Examiner*—Joseph F. Peters, Jr.
*Assistant Examiner*—John A. Carroll
*Attorney, Agent, or Firm*—Charles R. White

[57] ABSTRACT

A suspension strut for a motor vehicle in which a steering knuckle is supported by a housing of a telescopic damper. A piston rod projecting from the damper housing has a support flange secured to its free end to form part of a flexible mounting for a body portion of the vehicle. A helical suspension spring is seated at its lower end on an annular bracket carried by the damper housing and at its upper end on a spring support plate surrounding the piston rod. A needle-roller thrust bearing is interposed between the piston rod support flange and the spring support plate to accommodate rotary movement of the spring and support plate during steering maneuvers.

To provide a predetermined amount of bearing friction, a friction element in the form of a circular bead is arranged between the piston rod support flange and the spring support plate. The circular bead is formed as a part of a cage of plastic material serving to locate the individual needle rollers of the bearing.

6 Claims, 5 Drawing Figures

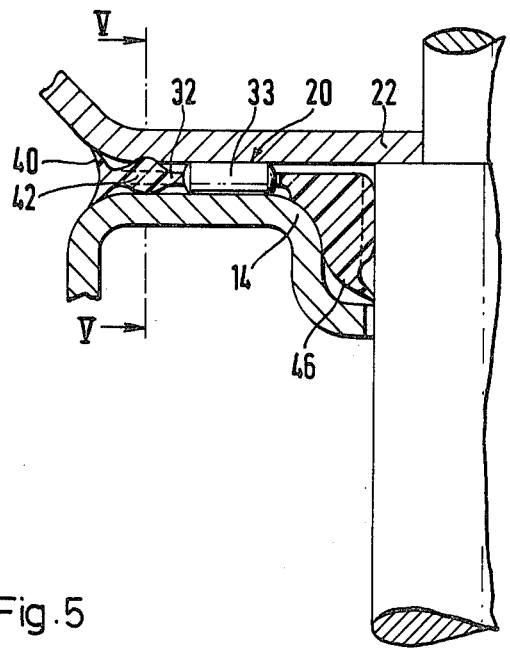
Fig. 4
Fig. 5
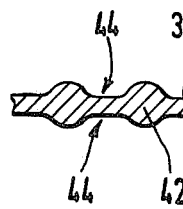
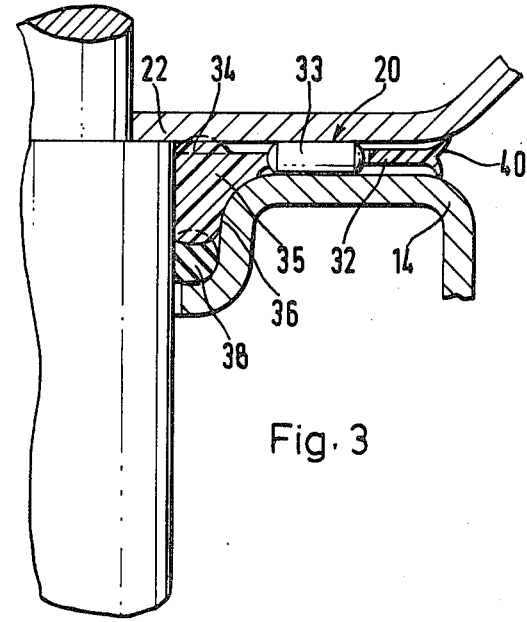
Fig. 3

MOTOR VEHICLE SUSPENSION STRUTS

This invention relates to suspension struts for motor vehicles, utilising a telescopic damper.

In motor vehicles having a front wheel suspension utilising a MacPherson suspension strut, a rotary movement of the strut relative to the vehicle body takes place when the vehicle is rounding a bend and during other steering maneuvers. The upper spring support plate of the suspension strut executes a rotary movement of up to about 40° to the right or left, with respect to a support flange secured to the upper end of the piston rod of the strut.

Prior to the present invention needle bearings have been provided between the spring support plate and the piston rod support flange. This needle bearing may be formed as a thrust bearing of small constuctional height that receives the alternating vertical forces of the spring and ensures that the relative movement between the spring support plate and piston rod support flange occurs with the desired low frictional resistance.

However, it has been recognized that any rotary vibrations likely to be transmitted to the steering wheel could be appropriately damped at this point. Such damping is not inherently provided by a needle bearing, or indeed by any form of rolling bearing.

The provision of a friction ring of plastic material between the spring support plate and the piston rod support flange may provide increased adhesive friction and sliding friction, and is therefore suitable for damping rotary vibrations. The adhesive and sliding friction of such a friction ring is however, load-responsive, in that, depending on the loading of the vehicle, the changing forces from the spring cause the adhesive and sliding friction to change correspondingly.

An object of the present invention is to achieve a damping action for rotary vibrations of the steering wheel at the point of the resilient suspension strut, such damping to have the same value at every loading of the motor vehicle, and the amount of damping to be predeterminable.

Another object of the invention is to provide a resilient strut suspension of the above-identified kind with a new and improved friction element between the spring support plate and the piston rod support flange, in order to attain a predetermined bearing friction.

Advantageously the friction element is formed by an arcuate or circular bead partially or completely surrounding the piston rod, and pre-stressed into frictional engagement with the spring support plate and/or the piston rod support flange. Since the support flange and the piston rod of the telescopic damper are fixedly connected to each other, the friction element can be arranged between the spring support plate and the piston rod itself. It will be evident that, in order to attain a specific amount of damping, a greater amount of friction will be required as the friction element is positioned closer to the piston rod.

One possible embodiment of the invention is based on the concept of utilising as the friction element a bead which, in the unstressed condition, has a greater thickness than the distance between the spring support plate and the piston rod support flange at the location of the bead. With such construction, using a predetermined bead, it is difficult to subsequently alter the amount of damping.

However, such subsequent alteration of the amount of damping of the steering wheel vibrations is readily possible if, in accordance with a further, preferred feature of the invention, the bead has a thickness which is less than the distance between the spring support plate and the piston rod support flange furthermore, a stressed element is provided between the bead and the spring support plate or between the bead and the piston rod support flange. Preferably this stressed element comprises a rubber ring. By the choice of such an interposed rubber ring with a cross-section which has a dimension in the longitudinal direction of the strut allowing variation in application pressure—preferably against the piston rod support flange—in order to achieve a greater or lesser amount of friction.

Since as a practical matter a cage will be present for providing location for the individual needles of the needle bearing, this cage can conveniently be utilised as a basis for the formation of the bead. This can be accomplished in various ways, preferably by forming the bead on a bearing cage of flexible plastic material having appropriate frictional characteristics, with the bead consisting of the same material as the cage and having a corresponding coefficient of friction, the stressing of the bead in the installed condition being selected to be appropriate to this coefficient of friction.

The bead can in principle be arranged at practically any location on the bearing cage. A particularly suitable location is between the rolling members of the bearing and the outer peripheral region (outer edge) of the bearing cage, since this location provides the greatest possible distance from the piston rod, and the frictional resistance for a particular amount of damping can therefore be less. The outer peripheral region of the bearing cage may be provided with a lip seal, which may be so designed that it acts itself as a friction element, preferably supplementing the frictional resistance of a bead.

If a stressed element in the form of a rubber ring is provided in conjunction with the bead, for the purpose of making provision for adjustment of the friction, and therefore of the damping, at the time of assembly, it is advantageous to arrange that the spring support plate and/or the piston rod support flange with a circular depression which surrounds the piston rod and in which the rubber ring is fitted. If the arrangement is such that this rubber ring bears against both the spring support plate and the piston rod, the rubber ring can serve to provide a seal between the piston rod and the through aperture at the inner peripheral region of the spring support plate.

In the drawings:

FIG. 3 is a fragmentary further enlarged somewhat schematic longitudinal section showing details of the strut mounting illustrated in FIG. 2;

FIG. 4 is a view similar to FIG. 3, but of another embodiment of a suspension strut mounting in accordance with the present invention; and FIG. 5 is a section on the line V—V of FIG. 4, in the direction of the arrows.

Figure 1:
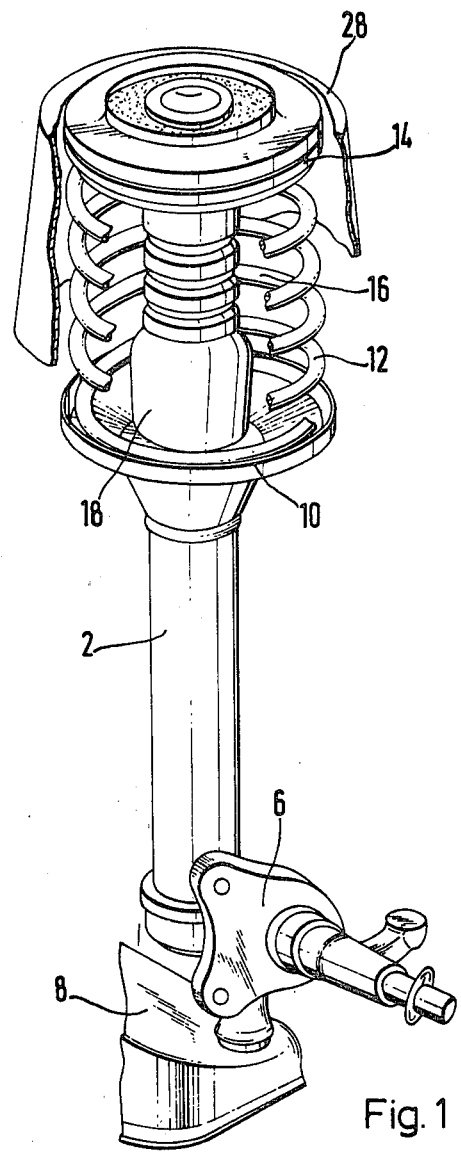
FIG. 1 is a fragmentary perspective showing a telescopic suspension strut in a front-axle suspension for a vehicle.
Figure 2:
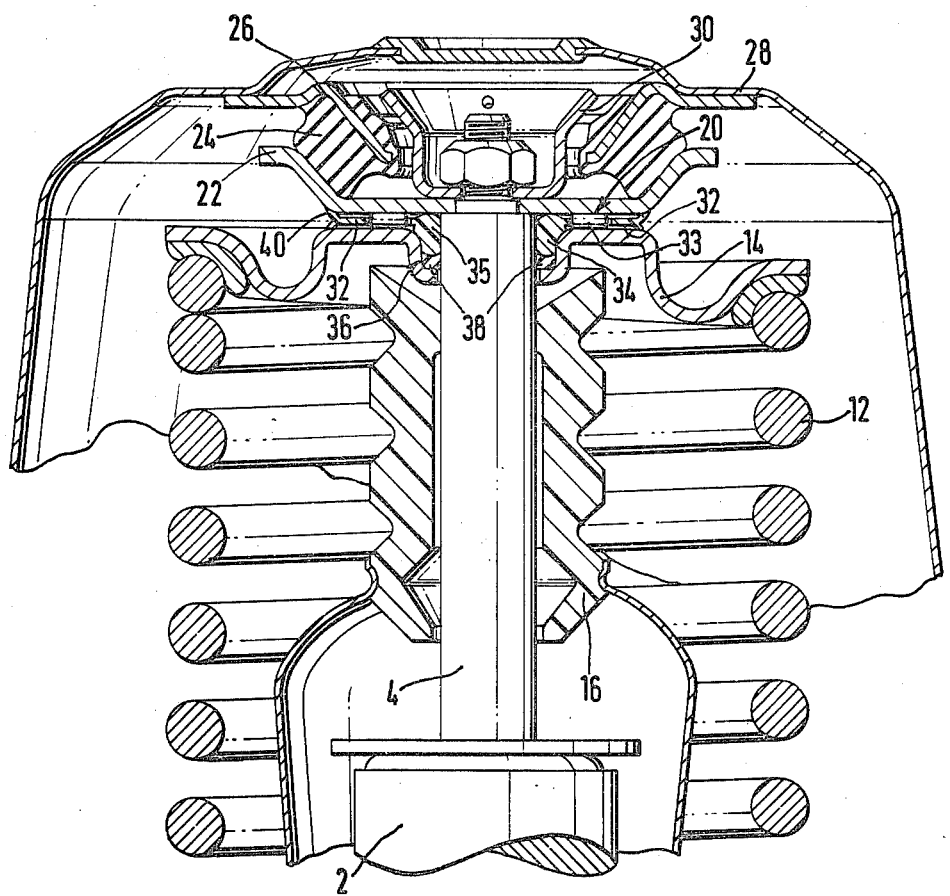
FIG. 2 is a fragmentary enlarged longitudinal section illustrating one embodiment of a suspension strut mounting in accordance with the present invention.

As is shown in FIG. 1 and 2 of the drawings, a telescopic suspension strut of a front-axle suspension for a vehicle includes a damper housing 2 and a piston rod 4

(FIG. 2). The damper housing 2 is fixedly connected to a steering knuckle 6, and a pivotal front axle control arm 8 is articulated to the steering knuckle by means of a ball joint. A helical compression spring 12 is maintained in compression between a lower spring seat constituted by an annular support bracket 10 secured to the damper housing 2, and an upper spring seat constituted by an annular support plate 14 surrounding the piston rod 4 of the damper. Below the annular support plate 14, the piston rod 4 is surrounded by a ribbed buffer sleeve 16 of elastomeric material, which at its lower end carries a bell-shaped extension member 18.

A needle bearing 20 is interposed between the spring support plate 14 and a support flange 22, to form a thrust bearing between these parts. A rubber mounting bush 24 is connected to the support flange 22 and to a frustoconical mounting flange 26 that is fixed to a part 28 of the vehicle body. The support flange 22 is secured to the upper end of the piston rod 4 by means of a nut which is tightened on a threaded end portion of the piston rod to hold the support flange securely between an intermediate cup member 30 and a shoulder on the piston rod.

The needle bearing 20 between the spring support plate 14 and the support flange 22 permits easy relative movement of these two parts during steering maneuvers. For the purpose of damping rotary vibrations of the steering wheel of the vehicle, by the provision of bearing friction which is constant over the entire operating range, a friction element is provided between the spring support plate 14 and the piston rod support flange ring 22.

In the embodiment shown in FIGS. 2 and 3, this friction element consists of an annular bead 34 formed on a cage 32 for the needles 33 of the needle bearing 20, the cage 32 being formed of a resilient plastic material having the required friction properties. The part of the spring support plate 14 adjacent the piston rod 4 is formed, for example by stamping, with an annular depressed portion 36 which accommodates a thickened portion 35 at the inner peripheral region of the bearing cage 32. A rubber ring 38 is fitted into the depression 36, between the spring support plate and the thickened inner peripheral portion of the cage 32, and forces the thickened portion upwardly so that its upper surface acquires an upwardly bulged configuration constituting the annular bead 34. This annular bead 34 may of course have a shape differing from that shown in FIG. 3. In this embodiment a cage 32 is used which in an unstressed condition has flat faces, as seen in the radial direction, at its inner peripheral region.

With this construction, the rubber ring also serves as a seal between the piston rod 4 and the spring support plate 14.

A rubber ring 38 having a larger cross-sectional area than that illustrated could alternatively be used, to produce a greater pressure of the annular bead 34 of the cage 32 against the piston rod support flange 22, so increasing the amount of friction.

Numerous alternative possibilities are available for the formation and arrangement of the depression 36 in the spring support plate 14, of the piston rod support ring 22, of the inner or the outer peripheral region of the cage 32, and of the rubber ring 38.

The outer peripheral region of the cage 32 is provided with a lip seal 40, comprising sealing lips moulded integrally with the cage 32, to protect the bearing from dirt and water. The sealing lips can additionally serve to contribute to the total friction between the spring support plate 14 and the piston rod support flange 22.

In the embodiment which is illustrated in FIGS. 4 and 5, the rubber ring 38 is omitted, and the required friction is produced by an annular bead 42 formed at the outer peripheral region of the cage 32 of the needle bearing 20. In the initial, unstressed condition of the cage 32, the annular bead 42 has a thickness which is greater than the distance between the spring support plate 14 and the piston rod support flange 22. Assembly of the parts causes the annular bead 42 to be compressed, thereby producing the desired friction. Again, a lip seal 40 is present at the outer peripheral region of the cage 32. As is illustrated in FIG. 5, the annular bead 42 is provided with radially extending channels 44, permitting lubricant transfer along these channels. The lower part of the inner peripheral region of the cage 32 is provided with an annular sealing lip 46 which engages the piston rod.

We claim:

1. A suspension strut for a motor vehicle, comprising a telescopic damper having a housing forming a support for a steering knuckle, a piston rod projecting from the housing, support bracket means secured to the damper housing, a spring support plate surrounding the piston rod, a helical suspension spring having opposite ends thereof seated on the support bracket means and on the spring support plate respectively, a support flange secured to the piston rod, resilient mounting means connected to the support flange to form a resilient mounting permitting limited piston rod movement relative to a body portion of the vehicle, a rolling bearing interposed between the spring support plate and the piston rod support flange, and a friction element of resilient plastic material in parallel relationship with said bearing operatively disposed between the spring support plate and the piston rod support flange and in direct frictional engagement therewith to provide a predetermined amount of bearing friction therebetween.

2. A suspension strut for a motor vehicle, comprising a telescopic damper having a housing for supporting a wheel spindle, a piston rod projecting from the housing and having a support flange secured thereto, resilient mounting means mounted on said support flange and operatively connected to a body portion of the vehicle, an annular spring support plate surrounding a part of the piston rod adjacent the support flange, said support flange and said support plate having flat surface portions facing one another, a rolling thrust bearing operatively interposed between said facing flat surface portions of said piston rod support flange and of said spring support plate respectively, an annular support bracket means carried by said damper housing, a helical suspension spring having one end thereof seated on said annular support bracket means and an opposite end thereof seated on said spring support plate, and a friction element of resilient plastic material constituted by a circular bead surrounding the piston rod between said piston rod support flange and said spring support plate, said bead being prestressed into frictional engagement with said piston rod support flange and said spring support plate to provide a predetermined amount of bearing friction therebetween.

3. A suspension strut for a motor vehicle comprising a telescopic damper having a housing, a piston rod operatively mounted in said housing and projecting therefrom and terminating in an end portion, a support flange secured to said end portion of said piston rod, an annular spring support plate spaced from said support flange, a needle thrust bearing assembly having a plurality of needles operatively interposed between said support flange and said support plate, a helical suspension spring having one end thereof seated on said support plate, bracket means carried by said damper housing for mounting the other end of said helical suspension spring, said bearing assembly including an annular bearing cage of plastic material disposed between said support flange and said spring support plate and having a plurality of locating apertures for accommodating said needles of said thrust bearing, said apertures being formed in an outer peripheral region of said cage, said cage having a circular bead which in an unstressed condition has a thickness greater than the distance between said piston rod support flange and said spring support plate, said bead being in frictional engagement with both said piston rod support flange and said spring support plate when assembled therebetween to provide a predetermined amount of bearing friction therebetween.

4. A suspension strut for a motor vehicle, comprising a telescopic damper having a housing with a piston rod projecting therefrom and terminating in a free end portion, a support flange secured to said free end portion of said piston rod, an annular spring support plate surrounding a part of the piston rod adjacent the support flange, a needle thrust bearing interposed between said piston rod support flange and said spring support plate, support bracket means secured to said housing of said damper, a helical suspension spring operatively mounted in compression between said spring support plate and said support bracket means, an annular bearing cage of plastic material for said needle thrust bearing, said cage having a plurality of locating apertures therein for accommodating the individual needles of said thrust bearing, said cage having a lip seal formed at a peripheral region thereof for providing frictional resistance to rotary movements of the spring support plate, said cage further having a circular bead in frictional engagement with said piston rod support flange to provide a predetermined amount of bearing friction between said spring support plate and said piston rod support flange.

5. A suspension strut for a motor vehicle, comprising a telescopic damper having a housing with a piston rod projecting therefrom and terminating in an end portion, a support flange secured to said end portion of said piston rod, an annular spring support plate surrounding a part of said piston rod adjacent said support flange, support bracket means carried by said housing, a helical suspension spring having opposite ends thereof respectively seated on said spring support plate and on said support bracket means, a thrust bearing disposed between said piston rod support flange and said spring support plate and including individual needle rollers, said bearing having a cage formed of a resilient plastics material with a plurality of apertures formed therein for receiving said individual needle rollers of said bearing, and a rubber ring surrounding the piston rod and operatively disposed said cage and said spring support plate, said rubber ring being stressed when assembled with said cage to deflect a portion of said cage into a bulged configuration to constitute a circular bead which frictionally engages said piston rod support flange to thereby provide a predetermined amount of bearing friction between said support flange and said support plate.

6. A suspension strut for a motor vehicle, comprising a telescopic damper having a housing, a piston rod projecting from the housing and terminating in an end portion, a support flange secured to said end portion of said piston rod, an annular spring support plate surrounding a part of said piston rod, a needle thrust bearing in operative engagement with respective surfaces of said support flange and said spring support plate, a cage of resilient plastic material having a plurality of apertures therein for accommodating individual needles of said bearing, support bracket means carried by said damper housing, a helical suspension spring in compression operatively mounted between said spring plate and said support bracket means, a circular depression formed in said spring support plate at a location surrounding and adjacent to said piston rod, a rubber ring accommodated in the said circular depression and bearing against said piston rod with a sealing action, said rubber ring being maintained in a stressed condition against said bearing cage to deform a surface portion of the said cage into a bulged configuration to thereby form a circular bead which frictionally engages said support flange to provide a predetermined amount of bearing friction between said support flange and said support plate.

* * * * *